(12) United States Patent
Eigenfeld

(10) Patent No.: US 7,954,626 B2
(45) Date of Patent: Jun. 7, 2011

(54) CONVEYOR ROLLER HAVING A CLEANING FUNCTION

(75) Inventor: Udo Eigenfeld, Hueckelhoven (DE)

(73) Assignee: Interroll Holding AG (CH)

( * ) Notice: Subject to any disclaimer, the term of this patent is extended or adjusted under 35 U.S.C. 154(b) by 26 days.

(21) Appl. No.: 12/312,627

(22) PCT Filed: May 11, 2007

(86) PCT No.: PCT/EP2007/009888
§ 371 (c)(1),
(2), (4) Date: May 19, 2009

(87) PCT Pub. No.: WO2008/061667
PCT Pub. Date: May 29, 2008

(65) Prior Publication Data
US 2010/0051418 A1    Mar. 4, 2010

(30) Foreign Application Priority Data
Nov. 20, 2006   (DE) .................. 10 2006 054 575

(51) Int. Cl.
*B65G 45/22*        (2006.01)
(52) U.S. Cl. ..................................... 198/495; 15/256.52

(58) Field of Classification Search .................. 198/495; 15/256.5, 256.52
See application file for complete search history.

(56) References Cited

U.S. PATENT DOCUMENTS

| | | | | |
|---|---|---|---|---|
| 1,888,498 | A * | 11/1932 | Gipe et al. | 15/77 |
| 3,583,555 | A | 6/1971 | Karsnak et al. | |
| 5,745,945 | A * | 5/1998 | Manfredi et al. | 15/256.52 |
| 6,367,613 | B1 | 4/2002 | Montgomery | |
| 6,740,172 | B1 * | 5/2004 | Griffiths et al. | 198/495 |
| 6,978,880 | B2 * | 12/2005 | Barrett | 198/495 |

FOREIGN PATENT DOCUMENTS

| | | |
|---|---|---|
| DE | 38 40 951 | 2/1990 |
| DE | 10 2006 004 421 | 8/2006 |
| EP | 1 657 357 | 5/2006 |

* cited by examiner

*Primary Examiner* — James R Bidwell
(74) *Attorney, Agent, or Firm* — Gerald E. Hespos; Michael J. Porco

(57) ABSTRACT

The invention relates to a belt conveyor (1) having a conveyor roller (5) and such a conveyor roller (5) comprising a drum shell (54), a fluid connection (55), and at least one first fastening element (52) for fastening the conveyor roller (5) in a conveyor frame (3), wherein the drum shell (54) has an exterior pipe (541), which is rotatably supported about the first fastening element (52), wherein the exterior pipe (541) has a plurality of fluid outlet orifices (545) on the circumferential surface (543) thereof, and wherein the fluid connection (55) is in communication with the fluid outlet orifices (545).

12 Claims, 4 Drawing Sheets

CONVEYOR ROLLER HAVING A CLEANING FUNCTION

BACKGROUND OF THE INVENTION

1. Field of the Invention

The invention relates to a conveyor roller and to a belt conveyor.

2. Description of the Related Art

There are various conveyor installations in existence on which articles are transported on conveyor rollers or conveyor belts which are supported by conveyor rollers. In some cases, such conveyor rollers are driven.

Such conveyor installations are also used in sectors where stringent hygiene-related requirements have to be met, e.g. the food industry. Parts of the conveyor installation have to be cleaned, in some cases after every shift.

A problem to be addressed by the invention is that of providing a conveyor roller and a belt conveyor which contribute to a conveyor installation running reliably and to parts of the conveyor installation being easy to clean.

SUMMARY OF THE INVENTION

One aspect of the invention concerns a conveyor roller comprising a drum shell, a fluid connection and at least a first fastening element for fastening the conveyor roller in a conveyor frame, the drum shell having an outer tube which is rotatably supported about the first fastening element, the tube having a plurality of fluid-outlet openings on its circumferential surface, and the fluid connection being in communication with the fluid-outlet openings. Such a conveyor roller has the advantage that a cleaning fluid can be sprayed outward via the fluid-outlet openings, and that a belt which runs around the conveyor roller or a belt which runs past the conveyor roller, and is preferably configured as a link chain, and/or the conveyor roller can thus be cleaned.

Also preferred is an embodiment of the conveyor roller in which a flow space is formed between the outer tube and an inner tube, which is arranged, at least in part, in the outer tube. This embodiment ensures that a region which has no fluid flowing through it is created within the inner tube. Such an interior can accommodate elements of the conveyor roller which should not come into contact with the fluid.

A further advantageous embodiment relates to a conveyor roller in which the outer tube and inner tube are constituent parts of the drum shell. This design has the advantage that the inner tube and outer tube are easy to seal since there is no relative movement taking place between the inner tube and outer tube. Such a drum shell is easy to produce and ensures that all the fluid-outlet openings on the circumferential surface of the drum shell can be supplied uniformly with cleaning fluid.

Such a conveyor roller preferably has a configuration in which the interior of the inner tube is separated in a fluid-tight manner from fluid-channeling regions. This configuration also has the advantage that the interior of the inner tube can accommodate elements of the conveyor roller which should not come into contact with the cleaning fluid.

also preferred is such a conveyor roller which has a drive unit which is arranged within the drum shell, is connected in a rotationally fixed manner to the first fastening element and is connected to the drum shell such that the drum shell can be driven in a rotatable manner about the first fastening element. Such a conveyor roller has the advantage that, in a belt conveyor, conveyor rollers according to the invention may be provided not just in the region of the deflecting rollers or of the supporting rollers, but also as drive rollers. This has the advantage that a conveyor roller according to the invention can be provided at both points of deflection. The belt can be cleaned particularly effectively in these regions, in which there is a large angle of wrap of the belt around the conveyor roller, since the large angle of wrap gives rise to a larger region of the belt which can be sprayed with the cleaning fluid and thus cleaned. This applies, in particular, when the belt is configured as a link chain or when the belt has links. In this case, adjacent links pivot relative to one another in the region of deflection, and this pivoting means that it is also possible for the joints between the individual links to be cleaned to better effect.

A further advantageous embodiment concerns such a conveyor roller which also has, in the first fastening element, a cable lead-through for an electric cable which supplies the drive unit with power. Such an embodiment has the advantage that all, or at least some, of the necessary connections can be arranged on one side of the conveyor roller.

Also preferred is a configuration of a conveyor roller in which the fluid connection is provided on the first fastening element and/or on a second fastening element. Such a configuration has the advantage that the diameter of the fastening elements can be reduced, in which case such conveyor rollers may have a smaller diameter overall.

Furthermore, such a conveyor roller is preferably configured with two mutually separate fluid connections. In the case where two fluid connections are provided, it is possible, on the one hand, to achieve a higher fluid throughput and, on the other hand, this results in optimum dynamic pressure distribution, this making it possible to ensure uniform jet formation over the entire length of the tube. It is also possible to use different cleaning fluids. It is thus possible for just water, or water mixed with a cleaning agent, to be pumped, for example, through one connection and for a disinfectant to be pumped through the other connection. It is also conceivable for just water to be pumped through one connection and for cleaning agent to be pumped through the other connection. A further preferred embodiment is one in which the connections are provided with a nonreturn valve, in which case for example a disinfectant which is pumped through the one connection cannot be forced back into the water feed through the other connection. In a configuration with nonreturn valves, it would also be possible to feed a cleaning fluid via the one connection, to stop the flow of the cleaning fluid once cleaning has been carried out and to blow in compressed air via the other connection, in which case the belt and the conveyor roller are dried.

Also preferred is an embodiment of the conveyor roller in which the drum shell has, on its circumference, spacer elements which have bearing points for a belt which can be supported by the conveyor roller, as a result of which an envelope which is defined by the bearing points runs at a distance apart from an outer surface of the outer tube. Such spacer elements have the advantage that the belt circulates about the conveyor roller at a predetermined distance therefrom, as a result of which it is also possible for cleaning fluid to be sprayed onto the belt in the wraparound region.

d further advantageous embodiment relates to such a conveyor roller in which the spacer elements are designed as toothed-ring-form disks of which the teeth extend outward from the toothed ring. Disks configured in this way have the advantage that a belt, preferably configured as a link chain, comes into contact with the conveyor roller only via linear or punctiform bearing regions, in which case the belt or the link chain can be cleaned to good effect between the bearing regions.

A further aspect of the invention relates to a belt conveyor which has a conveyor roller as described herein and has a belt which is supported by the conveyor roller. Such a belt may comprise, for example, a textile belt which has a rubber-coated surface or a surface which is easy to clean using other surface treatments. Other belts are also possible, e.g. link chains or combinations of link chains and textile belts. Preferred belts are those which are constructed from modular plastic chains as are available on the market, for example, from Intralox.

Such a belt conveyor preferably has a configuration in which the conveyor roller is arranged at a point of deflection of the belt. At a point of deflection, the belt has the largest angle of wrap around the conveyor roller, in which case cleaning fluid can be sprayed onto the belt over a large angle of wrap and an optimum cleaning action can thus be achieved. This applies, in particular, when a link chain is used. In this case, adjacent links pivot relative to one another in the region of deflection and/or the link hinges open up, and therefore this pivoting/opening means that it is also possible for the joints between the individual links and/or the hinges of the links to be cleaned to better effect.

Individual particularly preferred embodiments of the invention will be described by way of example hereinbelow. The individual embodiments described, in some cases, have features which are not absolutely necessary in order to implement the present invention, but are generally considered to be preferable. It is also the case that embodiments which do not have all the features of the embodiments described hereinbelow should be considered as being disclosed within the teaching of the invention. In the same way, it is conceivable for features which are described in relation to different embodiments to be selectively combined with one another.

DETAILED DESCRIPTION OF THE PREFERRED EMBODIMENTS

Figure 1:
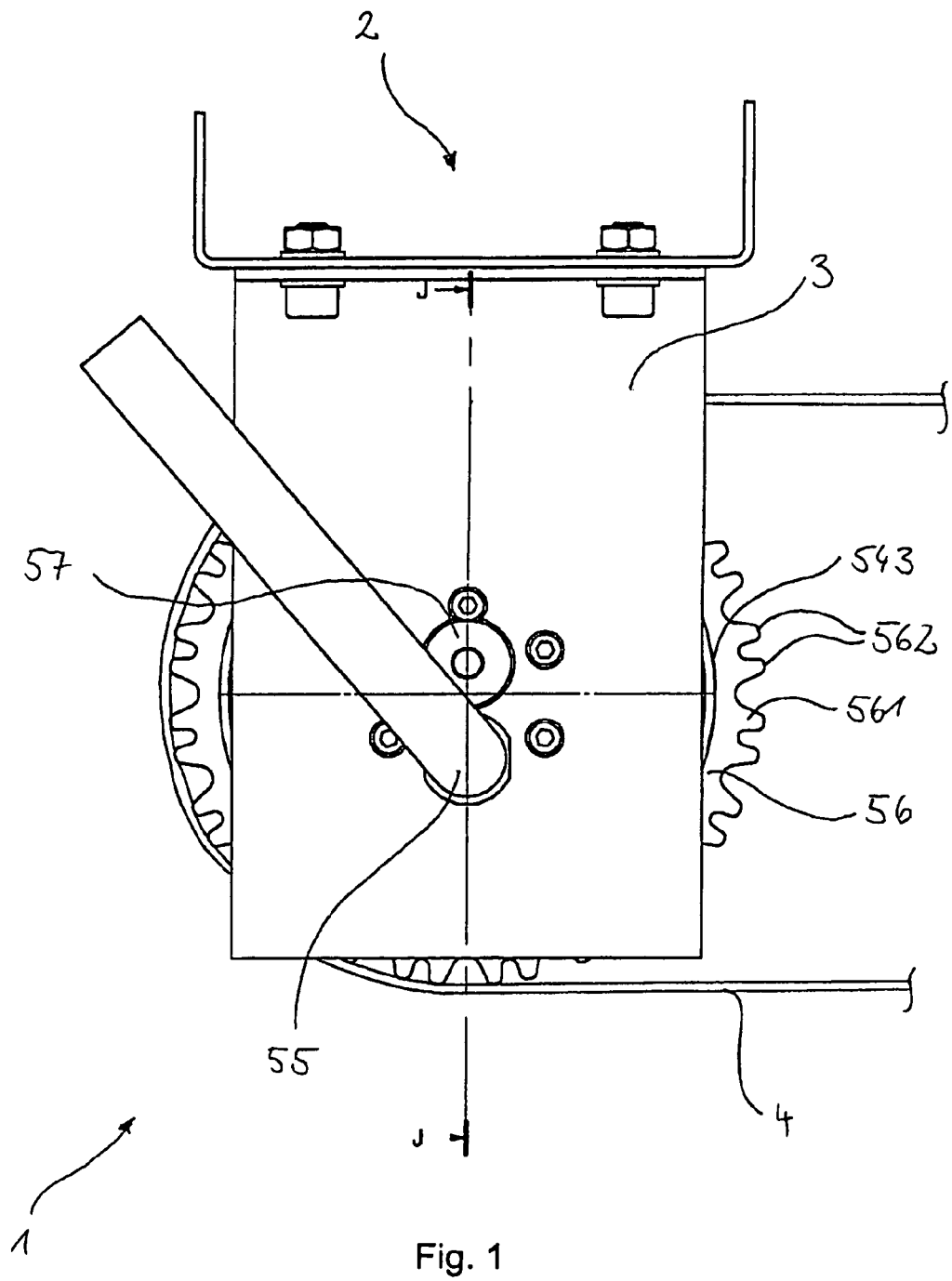
FIG. 1 shows a side view of a conveyor installation 1 having a conveyor roller 5 in a conveyor frame 3 according to the invention at a point of deflection 2 of a belt 4.

FIG. 1 shows a side view of a conveyor installation 1 having a conveyor roller 5 in a conveyor frame 3 according to the invention at a point of deflection 2 of a belt 4.

In the view illustrated, the incoming strand of the belt 4 is deflected through 180° and departs from the conveyor roller again essentially parallel to the incoming strand The term "point of deflection", however, should not be restricted to this configuration; rather, it covers all the configurations in which the running direction of the incoming strand differs from the running direction of the departing strand.

FIG. 1 illustrates the side view of the conveyor roller 5 on which both the fluid connection 55 and the cable lead-through 57 are arranged. A hose which supplies the conveyor roller with a cleaning fluid, e.g. water with or without a cleaning additive, or some other fluid is plugged onto the fluid connection 55.

The cable lead-through 57 is arranged alongside the fluid connection 55. In FIG. 1, both the cable lead-through 57 and the fluid connection 55 are respectively concealed by an electric cable 58 and by a hose which is plugged onto the fluid connection 55. The electric cable 58 is connected via a connector part to a corresponding connector part on the side of the conveyor roller 5. In the embodiment illustrated, the fluid connection 55 has a separate stub-like part which is plugged or screwed into a fluid opening on the end side of the conveyor roller 5. If this separate part is removed, then there is no longer any element of the fluid connection 55 projecting beyond the end surface in this region of the contact surface of the first fastening element 52, in which case the fluid connection does not obstruct fitting of the conveyor roller into the conveyor frame/removal of the conveyor roller from the conveyor frame. It is also the case that the plug-in connection between the electric cable 58 and the conveyor roller 5 is preferably configured to be flush with the surface of the first fastening element 52, in which case the conveyor roller 5 can easily be fitted/removed when the connector has been removed.

The connections in the region of the second fastening element 53 are preferably configured in the same way.

The diameter of the fastening elements 52, 53 of the conveyor roller according to the invention is preferably very much greater in relation to the axles of conventional conveyor rollers or drum motors, in which case preferably both the electrical plug-in connections and the blind holes for the screw connection and also the fluid connection 55 may be provided on the end surface of one of the fastening elements 52, 53. The fastening elements 52, 53 here are configured such that they project lengthwise only to a slight extent beyond the drum shell. The extent of projection on each side is preferably one to two millimeters.

Furthermore, preferably a groove for an O-ring, which encloses (screw) connections, is provided on the end surface of one or both fastening elements 52, 53. An O-ring inserted into this groove seals the fastening element in relation to the adjacent conveyor frame to form a dry region within the O-ring groove, which is separate from the wet region on the side of the drum shell. The dry region preferably contains the connection region. The conveyor frame is preferably configured as smooth sheet-metal wall at least in this region.

Alongside the cable lead-through 57 and the fluid connection 55, FIG. 1 also illustrates four hexagon-socket screws which fasten the conveyor roller 5 on the conveyor frame 3.

In the case of the preferred embodiment illustrated, the conveyor roller 5 has a plurality of spacer elements 56, of which one can be seen in part in FIG. 1. The spacer element illustrated is configured in a manner similar to a toothed ring and has teeth 561 with bearing points 562 formed at the radial ends thereof in each case. The spacer elements 56 are pressed or pushed onto a circumferential surface 543 of the drum shell 54 and fixed there for example by welding. In the case of a preferred embodiment, the drum shell 54 has, on the circumferential surface 543, a feather-key groove into which a feather key is inserted. The feather key engages in corresponding grooves of the spacer elements 56, in which case a torque can be transmitted from the drum shell to the belt 4 via the spacer elements 56. The feather-key groove can extend some way over the drum shell 54. The feather-key groove preferably extends over the entire width of the drum shell 54. Providing for torque transmission via the feather-key groove, feather keys and corresponding grooves of the spacer elements 56 makes it possible for the spacer elements to be mounted in a preferred floating manner, in which case it is possible to compensate for different coefficients of expansion between the conveyor roller and belt.

The belt 4 is preferably a textile belt with a rubber-coated surface or some other surface which allows straightforward cleaning. Such a belt is preferably configured such that it is strong enough for the teeth 561 of the spacer element 56 not to damage the belt 4. Should relatively high belt tensioning, in the case of which such resistance would no longer be ensured, be applied, that embodiment of the spacer element 56 which is shown may be replaced by spacer elements which provide a linear or planar bearing surface, in which case the surface loading of the belt 4 is reduced.

If use is made, for example, of a link chain instead of the belt 4 illustrated, individual link elements can engage in the interspaces between the teeth 561 of the spacer element 56, and this therefore creates a positive fit between the conveyor roller 5 and link chain in order for it to be possible for even high drive forces to be transmitted via the conveyor roller 5. Modular plastic chains are available on the market, for example, from Intralox.

Figure 2:
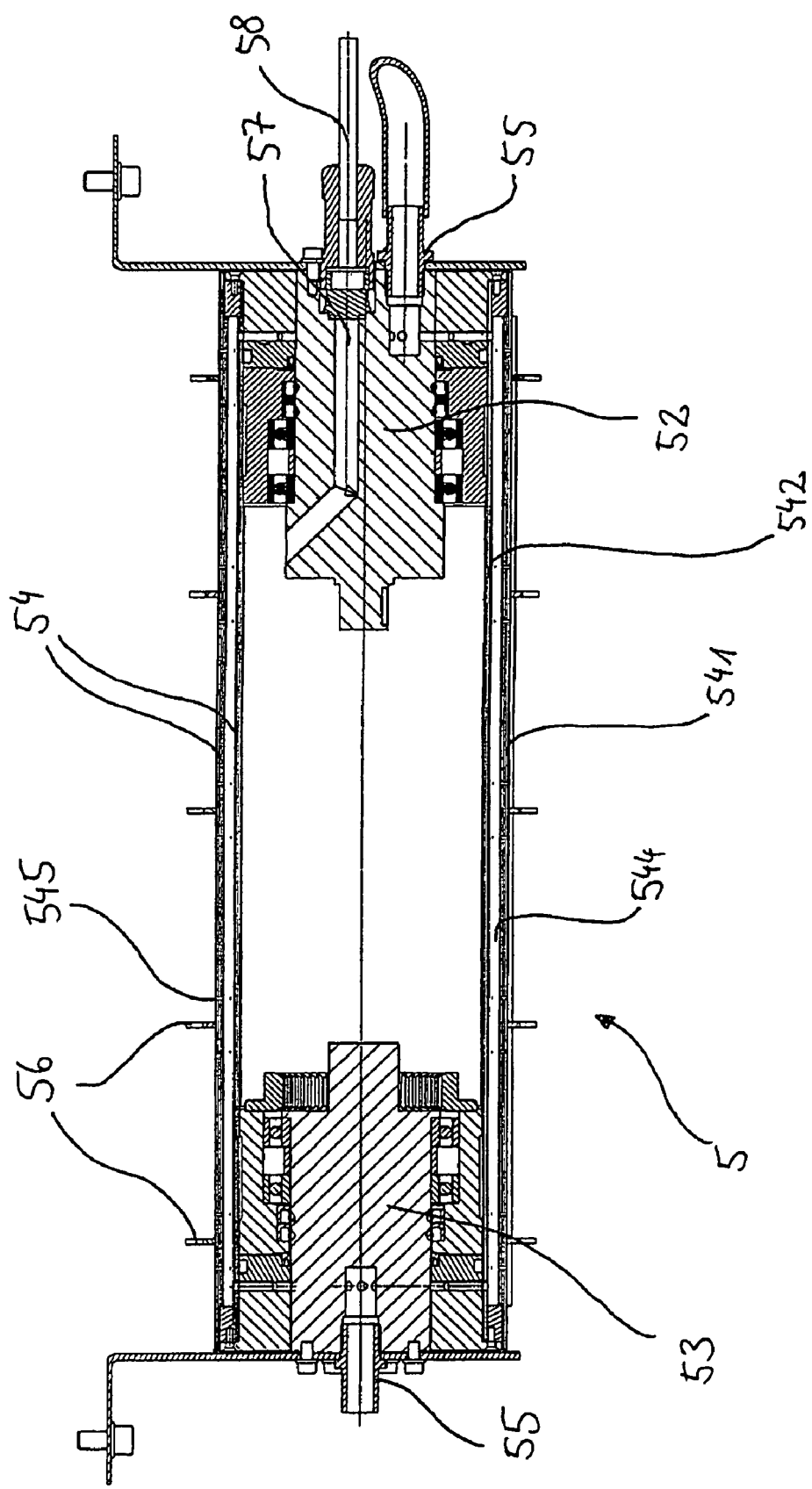
FIG. 2 shows a cross section through the conveyor frame and the conveyor roller from FIG. 1 along a section plane which is designated in FIG. 1 by J-J.

FIG. 2 shows a cross section through the conveyor frame and the conveyor roller from FIG. 1 along a section plane that is designated in FIG. 1 by J-J.

A first fastening element 52 is illustrated on the right-hand side of the conveyor roller 5. This first fastening element 52 is secured or fastened in a rotationally fixed manner in the conveyor frame 3 via the screws which have been described in relation to FIG. 1. A second fastening element 53 is illustrated on the left-hand side in FIG. 2, and is likewise secured in a rotationally fixed manner in the conveyor frame 3. The two fastening elements serve as axle(s) of the conveyor roller.

In the case of a conveyor roller having an inner drive unit, the torque of the drive unit may be absorbed on the conveyor frame via one or both of the fastening elements. Such drive units may have electric motors, hydraulic motors and/or gear mechanisms. The conveyor roller illustrated is suitable for accommodating a drive unit, although the drive unit is not illustrated in the figures.

In the embodiment illustrated, a respective fluid connection 55 is provided both in the first fastening element 52 and in the second fastening element 53. This preferred configuration gives rise to a uniform fluid pressure being generated in the flow space, which is advantageous, in particular, in the case of relatively long conveyor rollers.

A drum shell 54 is rotatably supported on the two fastening elements 52, 53. In the embodiment illustrated, the drum shell preferably has a lateral tube, designed as an outer tube 541, and a drum tube, designed as an inner tube 542. The outer tube 541 and the inner tube 542 are preferably sealed at their axial ends via an annular element which, at the same time, fixes the two tubes in relation to one another. A flow space 544 is formed between the two tubes.

The drum shell 54 is rotatably supported on the first and the second fastening element 52, 53 via various intermediate elements. For this purpose, inter alia rolling-contact bearings and seals are provided between the intermediate elements and the fastening elements. The seals ensure that a cleaning fluid which is pumped into the flow space 544 via the fluid connections 55 and the intermediate elements cannot pass into the interior in the inner tube 542 formed between the two fastening elements 52, 53. These seals are preferably annular shaft seals or axial face seals. These seals are also preferably configured such that they can also withstand high pressures.

The fluid connections are preferably designed as blind holes in the fastening elements. Orifices extend outward from these blind holes in the direction of the drum shell. Such orifices are also provided in the intermediate elements. In order that a cleaning fluid can flow continuously from the orifices at least of one of the fastening elements into the orifices of the respectively corresponding intermediate element, a preferably encircling groove, into which the orifices open out in each case, is preferably provided either on the fastening elements 52, 53 and/or on the intermediate elements. The orifices can thus communicate with one another irrespective of the angular position between the fastening elements and the intermediate elements.

The gap which is situated between the fastening elements and the intermediate elements in the direction of the conveyor frame 3 can likewise be sealed. This is not usually necessary since, for a cleaning action, it is advantageous if the cleaning fluid is also forced outward through this gap, in the axial direction of the conveyor roller 5, as far as the conveyor frame 3 and, there, is forced outward in the radial direction between the intermediate element and conveyor frame 3 and thus also helps to clean these surfaces. It is therefore preferred if there is no seal provided in these regions.

Figure 4:
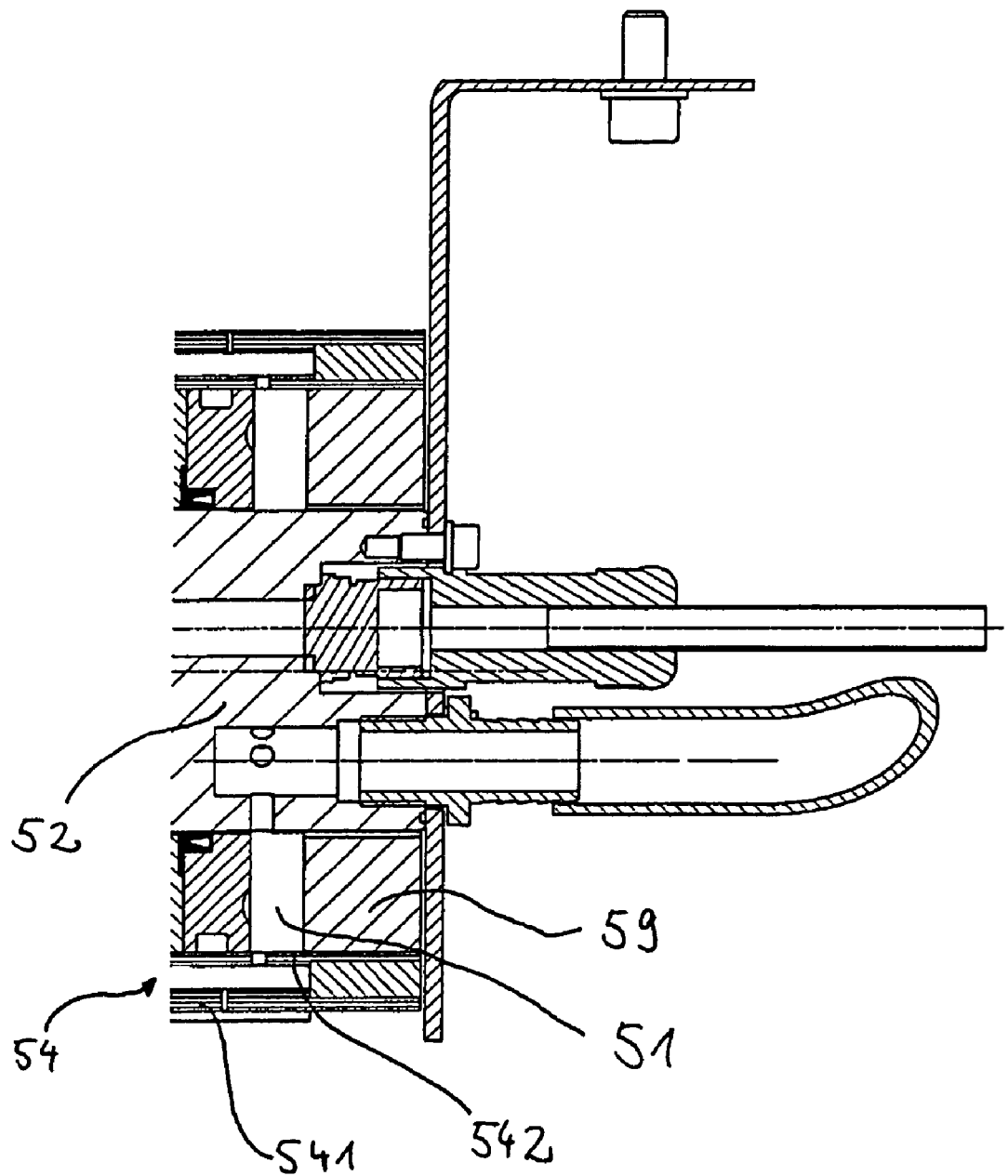
FIG. 4 shows a cross section through the conveyor frame and the conveyor roller from FIG. 1 in the region of the first fastening element, according to a further embodiment.

A further preferred embodiment is shown in FIG. 4. In the case of this preferred embodiment of the invention, a sliding element 59 is provided between the first fastening element 52 and the drum shell 54. This sliding element 59 is configured such that its circumferential surface which is directed toward the drum shell 54 and the inner surface of the drum shell 54 form a sliding fit which ensures that the sliding element 59 is accommodated in the drum shell 54 such that it can be displaced in the direction of the drum axis. On the inside of the sliding element, the inside being directed toward the first fastening element, a fluid gap is formed between the sliding element and the first fastening element.

The sliding element 59 is preferably provided, on its conveyor-frame end surface, with an essentially planar smooth surface, in which case the sliding element would butt essentially in surface contact against the surface of the conveyor frame if it were forced outward as far as it can go.

The sliding element 59 is preferably produced from an ultra-high-density polyethylene, preferably from PE 1000. Other materials having a low coefficient of friction may likewise be used.

In the case of the preferred embodiment which is shown in FIG. 4, an annular flow chamber 51 is formed between the first fastening element 52, the drum shell 54, the intermediate elements and the sliding element 59. The orifices which extend outward in the direction of the drum shell in the first fastening element preferably open out directly into this flow chamber 51. The flow chamber 51 is connected to the flow space 544 in the region of the drum shell via connecting openings. The orifices and the connecting openings are dimensioned such that the fluid which, during cleaning operation, flows through the orifices into the flow chamber 51, and from the latter, through the connecting openings, into the flow space 544, generates a dynamic pressure which acts on that side of the sliding element 59 which is directed away from the conveyor frame and forces this sliding element axially in the direction of the conveyor frame. At the same time, the fluid flows outward through the gap between the sliding element 59 and the first fastening element 52 and through the interspace between the sliding element 59 and conveyor frame. This gives rise to a hydrodynamic gap through which the fluid flows at high pressure, and therefore the surface between the conveyor frame and sliding element is cleaned.

The sliding element and the adjacent parts are preferably dimensioned here such that, during cleaning operation, the flow speed of the fluid is greater between the sliding element 59 and conveyor frame than in the flow chamber 51. As a result, the fluid pressure in the region of the flow chamber 51 is higher than between the sliding element 59 and conveyor frame, in which case the sliding element 59 is forced outward.

During normal operation (without any cleaning medium), the low coefficient of friction between the sliding element and conveyor frame means that the sliding element is subject to only minimal wear.

The conveyor roller is preferably likewise configured in the same way, with a sliding element, on the opposite side.

In the embodiment which is illustrated in the figures, a toothed ring with an inner toothing formation is provided in the region of the second fastening element 53, on that side of the second fastening element 53 which is oriented in the direction of the first fastening element 52. This toothed ring is connected to the drum shell 54 in a rotationally fixed manner via one of the intermediate elements. A drive unit, which is preferably provided in the interior of the inner tube 542, between the two fastening elements, but is not illustrated in this sectional view, can drive the drum shell 54 via this toothed ring. The drive unit here may be supported via a bearing journal which, in the embodiment illustrated, is provided on the first fastening element 52, in the direction toward the interior. As is illustrated, the bearing journal contains a groove into which a feather key can be inserted. It is also conceivable to have other configurations of shaft/hub connections via which a torque can be transmitted.

As illustrated in the drawing, the outer tube 541 of the drum shell 54 contains fine fluid-outlet openings 545 which are directed essentially radially outward. A cleaning fluid which is pumped via the fluid connection 55, through the fastening elements 52, 53, into the intermediate elements and into the flow space 544 can pass out via these fluid-outlet openings 545 and be sprayed onto the belt 4.

Since, in the embodiment illustrated, the spacer elements 56 are provided on the drum shell 54, the cleaning fluid can be sprayed onto the belt 4 over the extent of the distance between the drum shell and belt 4 which is provided by the spacer elements 56, as a result of which the cleaning action in this region is improved or is made possible for the first time.

Figure 3:
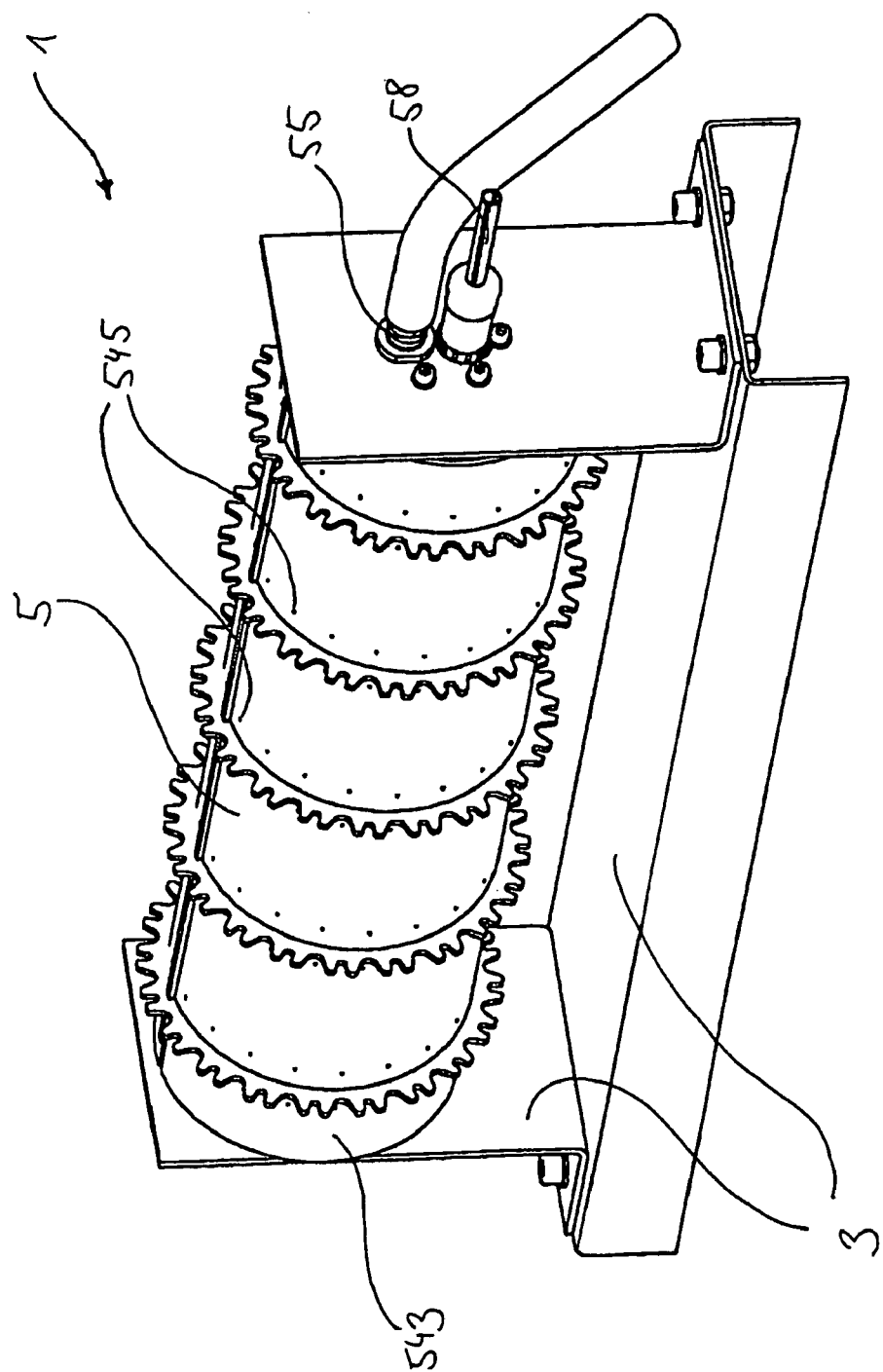
FIG. 3 shows an isometric view of a conveyor roller according to the invention fitted in a conveyor frame.

FIG. 3 shows an isometric view of a conveyor roller according to the invention fitted in a conveyor frame.

As can be seen in this figure, the fluid-outlet openings 545 are arranged in rows which run essentially parallel to the spacer element 56 along an imaginary edge of intersection between the outer surface of the drum shell 54 and a plane which is located perpendicularly to the drum axis of the conveyor roller 5.

In another preferred embodiment, the fluid-outlet openings 545 may be arranged along one or more helical lines running along the outer surface of the drum shell 54.

It is also preferred if, rather than being located radially, the fluid-outlet openings 545 are located, at least in part, obliquely in relation to a plane which is tangential to the drum shell 54. This means that a fluid jet strikes the belt 4 at an oblique angle, and the surface of the belt 4 is therefore subjected to a unidirectional fluid stream which can further improve the cleaning action.

Any other desired arrangements of the fluid-outlet openings are likewise conceivable.

The invention claimed is:

1. A conveyor roller (5) comprising a drum shell (54), a fluid connection (55) and at least a first fastening element (52) for fastening the conveyor roller (5) in a conveyor frame (3),
   the drum shell (54) having an outer tube (541) which is rotatably supported about the first fastening element (52),
   the outer tube (541) having a plurality of fluid-outlet openings (545) on its circumferential surface (543),
   the fluid connection (55) being in communication with the fluid-outlet openings (545), and
   a flow space (544) being formed between the outer tube (541) and an inner tube (542), which is arranged, at least in part, in the outer tube (541), the interior of the inner tube (542) being separated in a fluid-tight manner from fluid-channeling regions.

2. The conveyor roller (5) of claim 1, the outer tube (541) and inner tube (542) being constituent parts of the drum shell (54).

3. The conveyor roller (5) of claim 1, the fluid connection (55) being provided on the first fastening element (52) and/or on a second fastening element (53).

4. The conveyor roller (5) of claim 1, the drum shell (54) having, on its circumference, spacer elements (56) which have bearing points (562) for a belt (4) to be supported by the conveyor roller (5), as a result of which an envelope which is defined by the bearing points (562) runs at a distance apart from an outer surface of the outer tube (541).

5. A belt conveyor (1) which has a conveyor roller (5) as claimed in claim 1 and has a belt (4) which is supported by the conveyor roller (5).

6. The belt conveyor of claim 5, wherein the conveyor roller (5) being arranged at a point of deflection (2) of the belt (4).

7. A conveyor roller (5) comprising a drum shell (54), a fluid connection (55) and at least a first fastening element (52) for fastening the conveyor roller (5) in a conveyor frame (3),
   the drum shell (54) having an outer tube (541) which is rotatably supported about the first fastening element (52),
   the outer tube (541) having a plurality of fluid-outlet openings (545) on its circumferential surface (543), and
   the fluid connection (55) being defined by two mutually separate fluid connections in communication with the fluid-outlet openings (545).

8. The conveyor roller (5) of claim 7, a flow space (544) being formed between the outer tube (541) and an inner tube (542), which is arranged, at least in part, in the outer tube (541).

9. The conveyor roller (5) of claim 8, the interior of the inner tube (542) being separated in a fluid-tight manner from fluid-channeling regions.

10. A conveyor roller (5) comprising a drum shell (54), a fluid connection (55) and at least a first fastening element (52) for fastening the conveyor roller (5) in a conveyor frame (3),
    the drum shell (54) having an outer tube (541) which is rotatably supported about the first fastening element (52),
    the outer tube (541) having a plurality of fluid-outlet openings (545) on its circumferential surface (543),
    the fluid connection (55) being in communication with the fluid-outlet openings (545), and
    a drive unit arranged within the drum shell (54) and connected in a rotationally fixed manner to the first fastening element (52) and connected to the drum shell (54) such that the drum shell (54) can be driven in a rotatable manner about the first fastening element (52).

11. The conveyor roller (5) of claim 10, which also has, in the first fastening element (52), a cable lead-through (57) for an electric cable (58) which supplies the drive unit with power.

12. A conveyor roller (5) comprising a drum shell (54), a fluid connection (55) and at least a first fastening element (52) for fastening the conveyor roller (5) in a conveyor frame (3),
    the drum shell (54) having an outer tube (541) which is rotatably supported about the first fastening element (52),
    the outer tube (541) having a plurality of fluid-outlet openings (545) on its circumferential surface (543), the fluid connection (55) being in communication with the fluid-outlet openings (545), spacer elements on a circumference of the drum shell (54) and having bearing points (562) for a belt (4) to be supported by the conveyor roller (5), as a result of which an envelope which is defined by the bearing ponts (562) runs at a distance apart from an outer surface of the outer tube (541), the spacer elements (56) being designed as toothed-ring-form disks of which the teeth (561) extend outward from the toothed ring.

\* \* \* \* \*